(12) United States Patent  
Rucks

(10) Patent No.: US 8,146,531 B2  
(45) Date of Patent: Apr. 3, 2012

(54) PORTABLE MILKING APPARATUS

(76) Inventor: Chad Rucks, Okeechobee, FL (US)

( * ) Notice: Subject to any disclaimer, the term of this patent is extended or adjusted under 35 U.S.C. 154(b) by 164 days.

(21) Appl. No.: 12/356,699

(22) Filed: Jan. 21, 2009

(65) Prior Publication Data

US 2010/0180823 A1 Jul. 22, 2010

(51) Int. Cl.
*A01J 5/00* (2006.01)
*A01K 1/12* (2006.01)

(52) U.S. Cl. .................... 119/14.04; 119/520

(58) Field of Classification Search ........... 119/14.03, 119/14.04, 520, 512, 519, 728
See application file for complete search history.

(56) References Cited

U.S. PATENT DOCUMENTS

| | | | |
|---|---|---|---|
| 1,719,370 A * | 7/1929 | Hosier | 119/520 |
| 2,926,889 A * | 3/1960 | Obes | 254/419 |
| 3,019,763 A * | 2/1962 | Ferris | 119/14.03 |
| 3,828,733 A | 8/1974 | Corriea | |
| 3,877,419 A | 4/1975 | Rodger | |
| 4,034,711 A * | 7/1977 | Bender et al. | 119/14.11 |
| 4,508,058 A | 4/1985 | Jakobson | |
| 4,889,074 A | 12/1989 | Verbrugge | |
| 6,019,061 A | 2/2000 | Schulte | |
| 6,079,360 A | 6/2000 | Birk | |
| 6,237,530 B1 | 5/2001 | van der Lely | |
| 6,571,730 B1 | 6/2003 | Norberg | |
| 6,679,195 B1 | 1/2004 | Birk | |
| 6,814,026 B2 | 11/2004 | Guo | |
| 7,055,458 B2 | 6/2006 | Guo | |
| 2009/0260573 A1 * | 10/2009 | Rucks | 119/14.02 |

* cited by examiner

*Primary Examiner* — Kristen C Hayes

(57) ABSTRACT

Embodiments of a portable milking apparatus configured according to principles of the invention include a milking unit that is mobile and configured for milking an animal; a service unit that is mobile and configured for receiving milk; and a connector that selectably operably connects and/or permits fluid communication between the milking and service units.

21 Claims, 13 Drawing Sheets

300

305 Elevating the Animal Sufficiently to Enable Milking at an Ergonomically Optimal Height, Wherein Said Elevating Excludes Inclined Traversing

Fig. 9

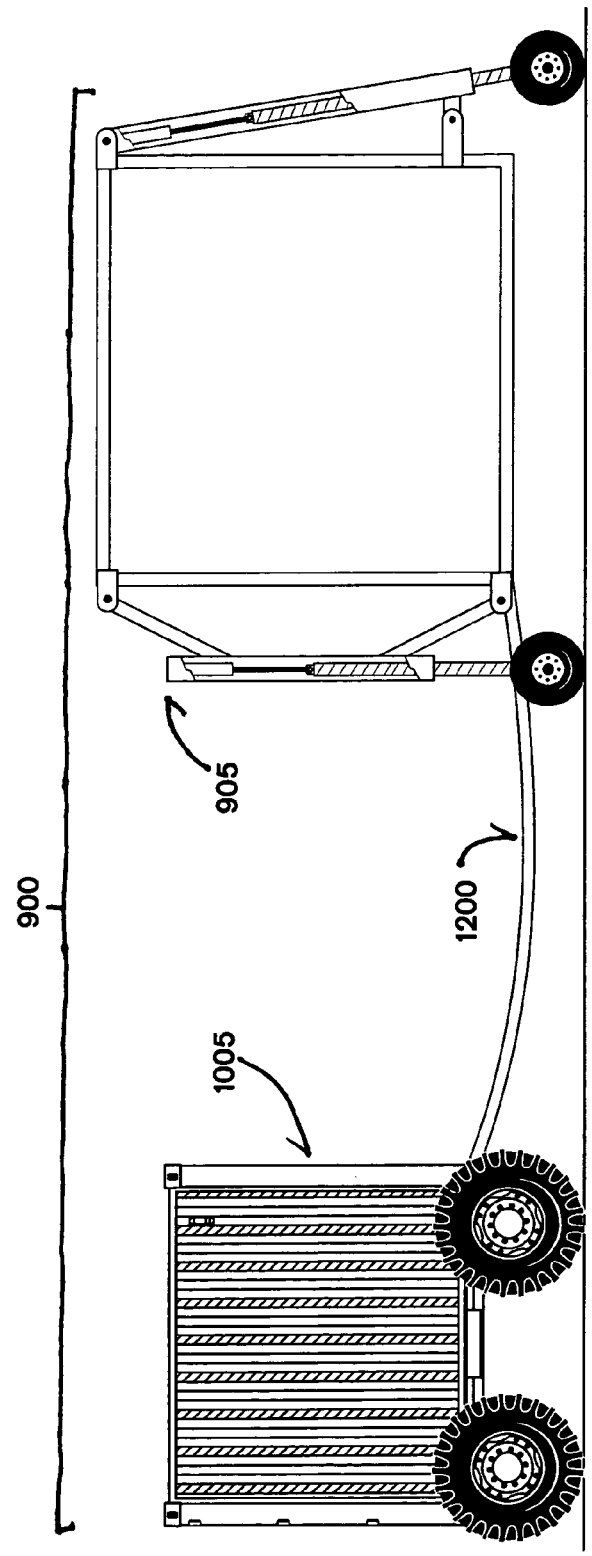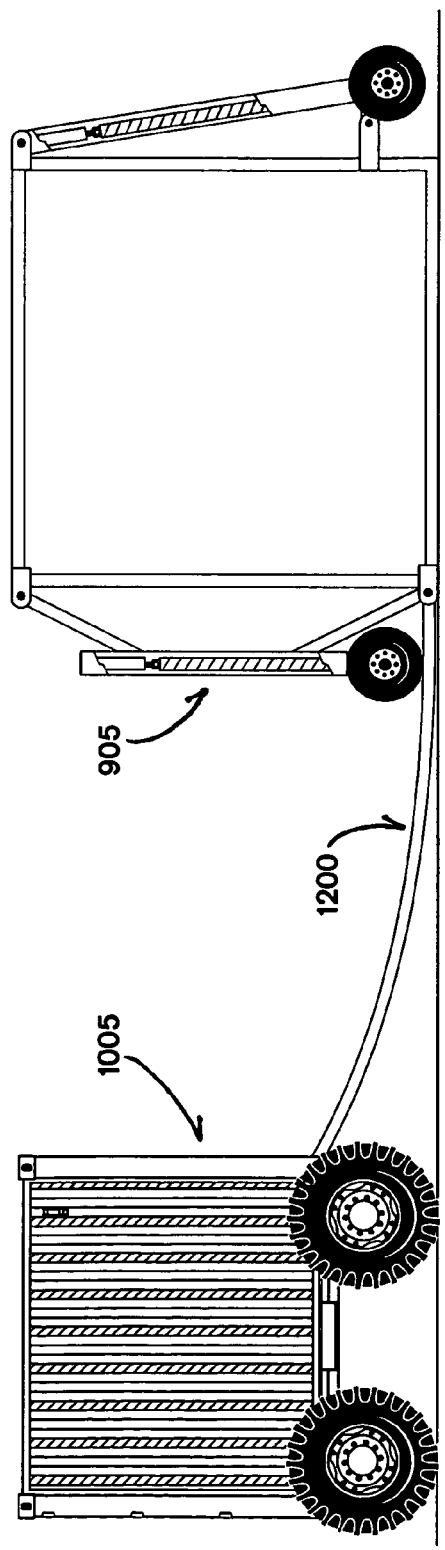
Fig. 14
Fig. 15

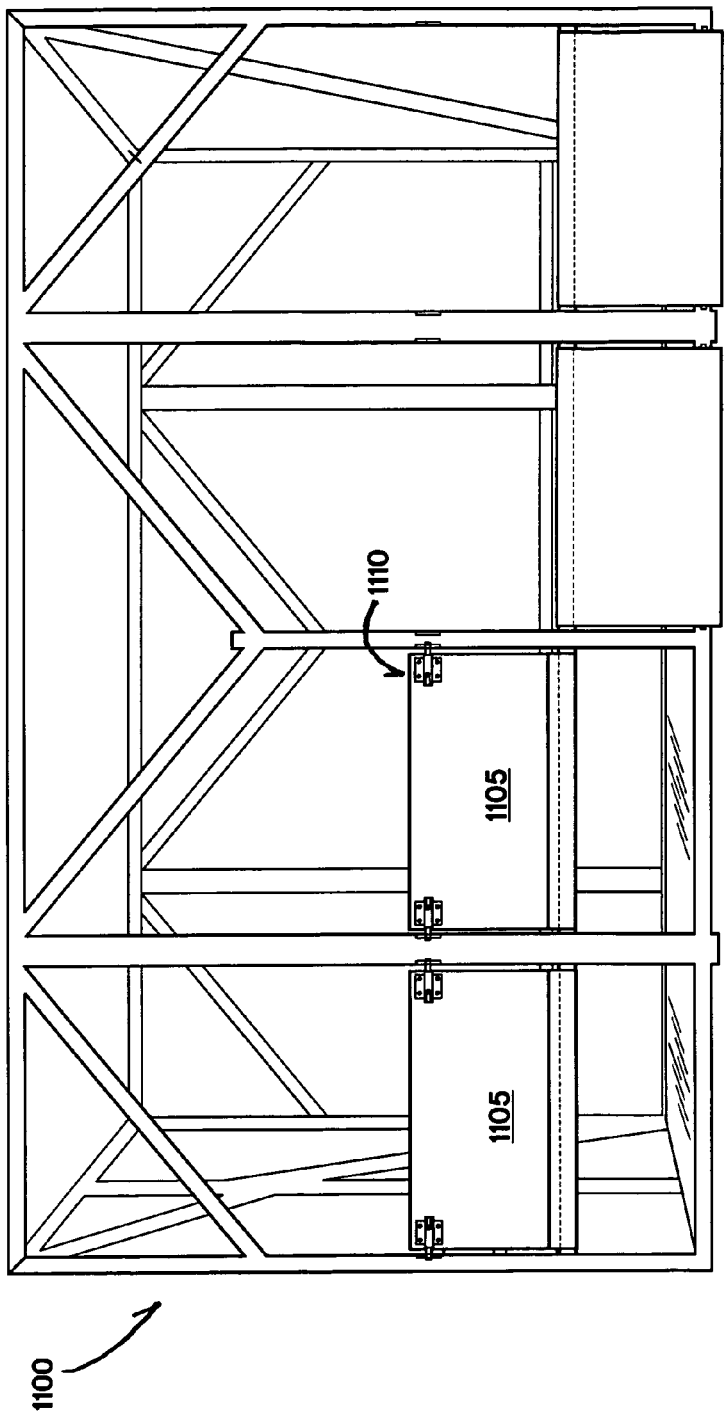
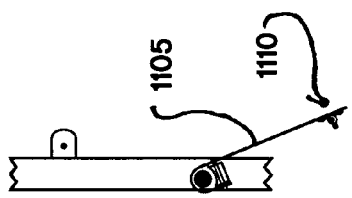
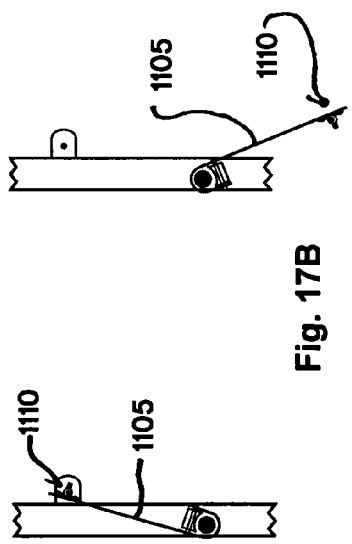
Fig. 16
Fig. 17B
Fig. 17A

PORTABLE MILKING APPARATUS

BACKGROUND OF THE INVENTION

The invention relates to a portable apparatus for and a method of milking cows and other dairy animals that range free in a pasture.

Dairy animals generally are milked at least twice a day. The manual work involved in milking is difficult and problematic from an ergonomic point of view. To reduce the risk of spinal issues that commonly arise from having to bend down to attach and remove the milking apparatuses, some dairy operations raise the animal to be milked relative to the dairy hands. However, such has been accomplished by means of ramps, as in U.S. Pat. No. 3,828,733, issued Aug. 13, 1974 to Correia for a Portable Milking Stall. However, hoofed animals are reluctant to ascend inclines and may suffer debilitating or fatal injuries while descending. Some inventions have resolved this with cars drawn up an inclined surface, as in U.S. Pat. No. 7,055,458, issued Jun. 6, 2006 to Guo for System for the Presentation of Animals to Be Milked and Method. However, such systems are not realistically feasible or economical.

What is needed is a portable milking apparatus and method that promote ergonomically-facile milking without having the animal ascend or descend a ramp or steps.

Research has shown that it is possible to increase the milk production from cows by 15-25% by milking three or even four times per day and this without detriment to the cows. Such benefits also may be found in other dairy animals, such as goats. However, the logistics and increased labor costs from herding the animals to a centralized milking facility limits profitable realization of this additional production.

Also, repeatedly congregating animals in one area for extended periods for milking causes a number of problems, including waste buildup. Dairy operations with permanent centralized milking facilities must clean the facilities and surroundings regularly to prevent the animals and dairy hands from becoming ill from waste-borne pathogens. Cleaning typically involves significant amounts of water drawn from an aquifer. The water combines with the waste and flows into manmade and natural waterways.

Another issue with centralized milking is that cows' repeated trampling kills grass and other vegetation en route to and around the milking facility. The reduced grazing space naturally discourages feeding cows from the denuded paths and promotes increased usage of spaces that gradually shrink as grazing thereon intensifies. As a consequence, the grazeable spaces experience increasingly higher nutrient loading, but as nutrient uptake by the grass is limited, more nutrients are brought into the local watershed basin.

While the trampled, hard-packed surrounding earth may be problematic, even more so are the concrete floors on which animals walk in centralized milking facilities. The hard concrete often causes hoof injuries over the long periods of time that the animals mill about the facilities. The concrete also can be slippery as it worn down and buffed with the detritus typical to the facilities, which causes the animals to fall and injure themselves, sometimes fatally.

In addition to the overgrazing that occurs, dairies with centralized milking facilities often harvest grass from other portions of the farm to provide to the cows while milking. Supplementary feed also may be purchased and brought to the facility. Both food supplying activities expend time and money, and typically involve burning carbon-based fuels by harvesting and transportation equipment that produces green house gases.

Another issue with denuded pastures is that animals thereon tend to accumulate fine-particulate mud and dust on their legs and udders. This undesirable residue, despite the best milking practices, increases the risk of mastitis, which is not healthy for the animal, and tends to wind up in the milk to some extent, which is not healthy for the public.

To counter these undesirable consequences, some dairies employ washing systems to wash off the animals before milking. The systems and operation thereof are expensive, time-consuming and expend a great deal of water that also must be recollected and disposed of.

In addition to environmental issues, centralized milking has significant economic considerations. First, permanent facilities are expensive to design and build. The expense can limit the natural expansion of a heard to what existing facilities can handle. Also, many dairy farmers lease the lands on which they raise their animals, so are reluctant to build what would be left behind after the lease ends.

What is needed is a portable milking apparatus and method that discourage the concentration of waste, thereby reducing the need for precious water resources and other consequences that remove nutrients.

SUMMARY OF THE INVENTION

The invention overcomes the disadvantages noted above by providing a portable milking apparatus and method that promote ergonomically-facile milking without having the animal to be milked ascend or descend, and discourage the concentration of waste, thereby reducing the need for precious water resources and other consequences that remove nutrients.

To that end, an embodiment of a portable milking apparatus configured according to principles of the invention includes a milking unit that is mobile and configured for milking an animal; a service unit that is mobile and configured for receiving milk; and a connector that selectably operably connects the milking and service units and/or permits fluid communication between the milking and service units.

The invention provides for positioning animals and dairy personnel such that the milker does not need to bend down to apply the milking unit. The invention also provides that milking unit application can take place from behind the animals in any of parallel, parabone, herringbone or other arrangements. The invention allows dairy hands to approach closely to the animals for easy application and removal of the milking units.

An advantage of the invention is that, since the parlor is mobile, animals are not repeatedly congregated in a certain location, therefore animal waste does not have to be washed out of a centralized facility, which reduces the amount of water removed from an aquifer and nutrient rich water leaving the farm in the form of high nutrient run off, which can pollute nearby waterways.

Another advantage of the invention is that, since the parlor is mobile, animals are not repeatedly congregated in a certain location, therefore nutrients from the animals are dispersed all over a pasture without high concentrations in one area, which promotes higher uptake of nutrients by local vegetation.

A further advantage of the invention is that, since the parlor is mobile, animals are not repeatedly congregated in a certain location, therefore fewer denuded areas arise from where the grass and vegetation has been destroyed by animals repeatedly using the same pathways to the milking facility, which promotes higher uptake of nutrients by the vegetation and less nutrients brought into a watershed basin.

Yet another advantage of the invention is that animals are not subject to denuded areas, thus have less accumulation of mud and dust on their legs and udders, which reduces the risk of mastitis and promotes cleaner, healthier milk for the public, and eliminates the need for expensive pre-milking washing systems.

The invention provides improved elements and arrangements thereof, for the purposes described, which are inexpensive, dependable and effective in accomplishing intended purposes of the invention.

Other features and advantages of the invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein:

FIG. 9 is a schematic view of a method of milking an animal configured according to principles of the invention;

FIG. 14 is a side elevational view of yet a further embodiment of a portable milking apparatus configured according to principles of the invention defining a stowed position;

FIG. 15 is a side elevational view of the embodiment of FIG. 14 defining a lowered position;

FIG. 16 is a side elevational view of an additional embodiment of a portable milking apparatus configured according to principles of the invention;

FIGS. 17A and 17B are side elevational views, drawn to an enlarged scale, of a portion of the embodiment of FIG. 16, respectively defining closed and access positions.

DETAILED DESCRIPTION OF THE PREFERRED EMBODIMENTS

The invention is a portable milking apparatus that promotes ergonomically-facile milking without having the animal to be milked ascend or descend, and discourages the concentration of waste, thereby reducing the need for precious water resources and other consequences that remove nutrients.

Figure 1:
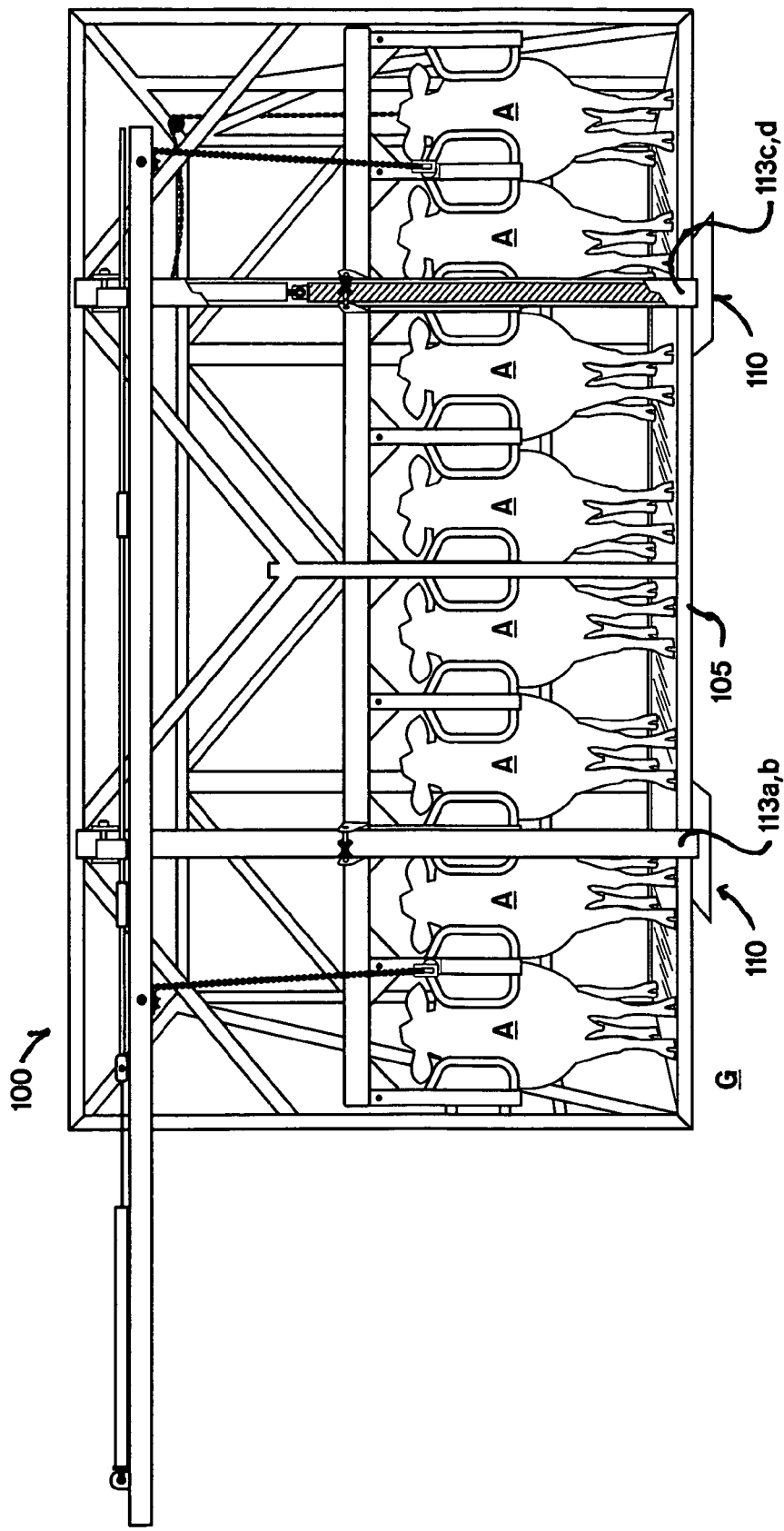
FIG. 1 is a front elevational view of an embodiment of a portable milking apparatus configured according to principles of the invention defining a lowered position.
Figure 2:
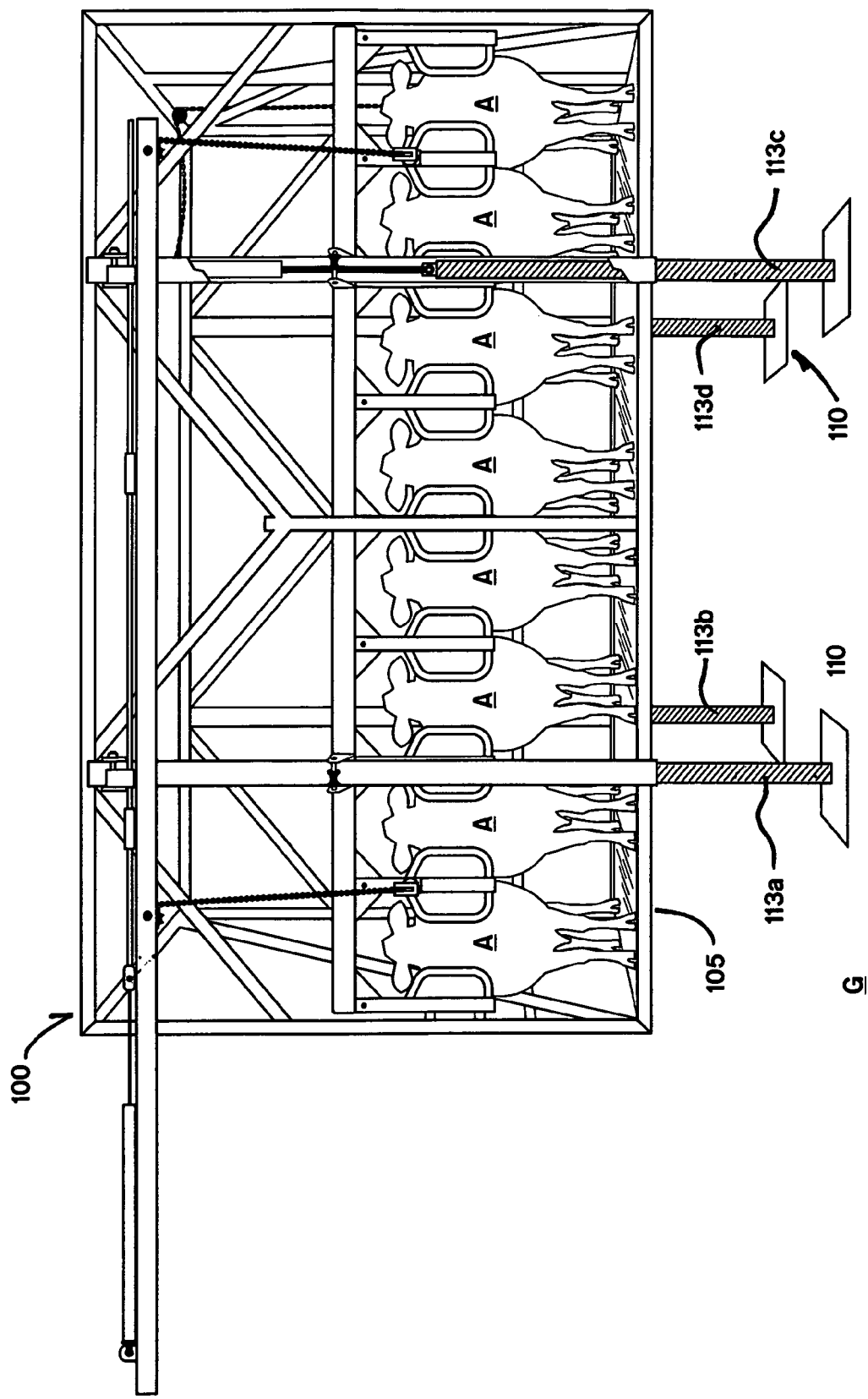
FIG. 2 is front elevational view of the embodiment of FIG. 1 defining a raised position.

Referring to FIGS. 1-4, an embodiment of the portable milking apparatus 100 configured according to principles of the invention includes a platform 105 configured to maintain multiple dairy animals A and an elevator 110 that positions platform 105 in at least a lowered position, wherein the platform is generally aligned with the ground G as shown in FIG. 1, and a raised position that enables milking at an ergonomically optimal height, as shown in FIG. 2.

Platform 105 is configured and constructed of any material appropriate for maintaining an animal, such as a cow.

Elevator 110, preferably, includes extensible legs 113*a-d* as shown. The invention may employ other means for elevating platform 105, such as a hydraulic or pneumatic cylinder, a rack and pinion, a jackscrew or combinations thereof.

Figure 5:
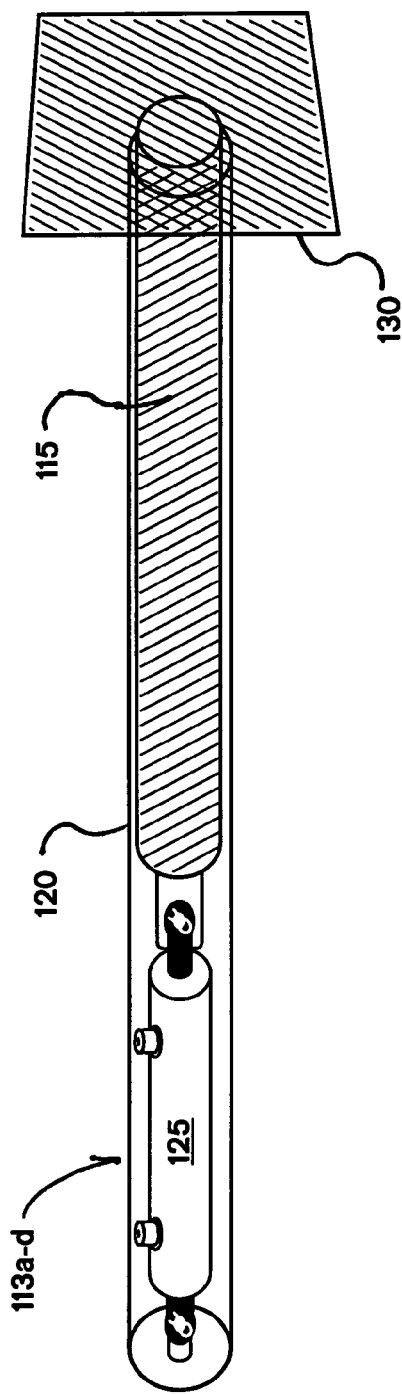
FIG. 5 is a partial cross-sectional detail view, drawn to an enlarged scale, of a portion of the embodiment of FIG. 1.
Figure 6:
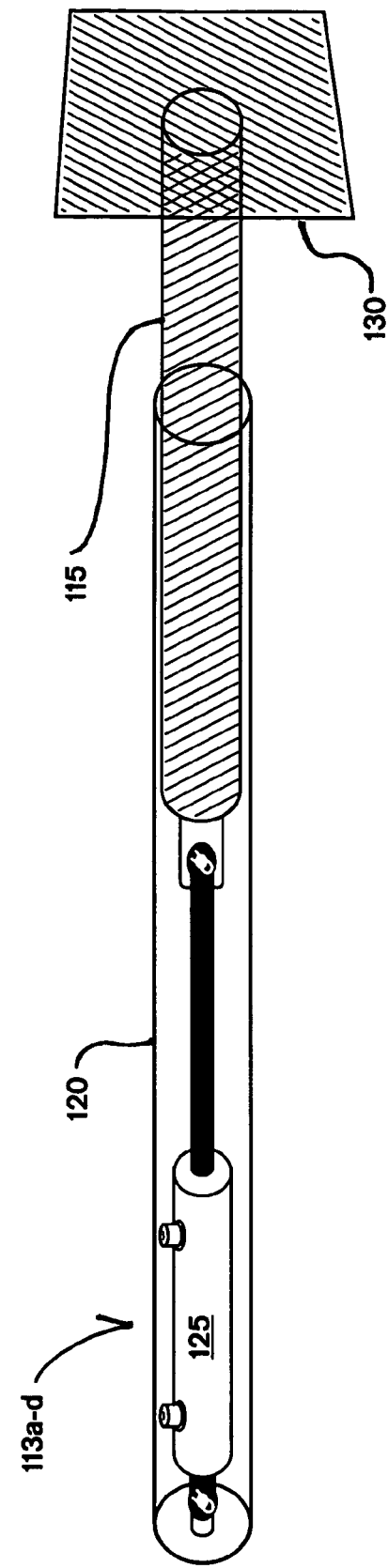
FIG. 6 is a partial cross-sectional detail view, drawn to an enlarged scale, of a portion of the embodiment of FIG. 2.

Referring also to FIGS. 5 and 6, each of legs 113*a-d*, preferably, includes a strut 115 received in a casing 120. Casing 120 is operably connected to platform 105. Strut 115 engages the ground G or field or pasture on which milking animals normally reside. A foot 130 may be interposed between strut 115 and ground G for increased stability.

A driver 125, such as a hydraulic, pneumatic or an electromagnetic cylinder, rack and pinion, jackscrew, or other means for extension and retraction of legs 100, is operably connected between strut 115 and casing 120 or platform 105 for effectuating relative movement, hence positioning of platform 105.

Figure 3:
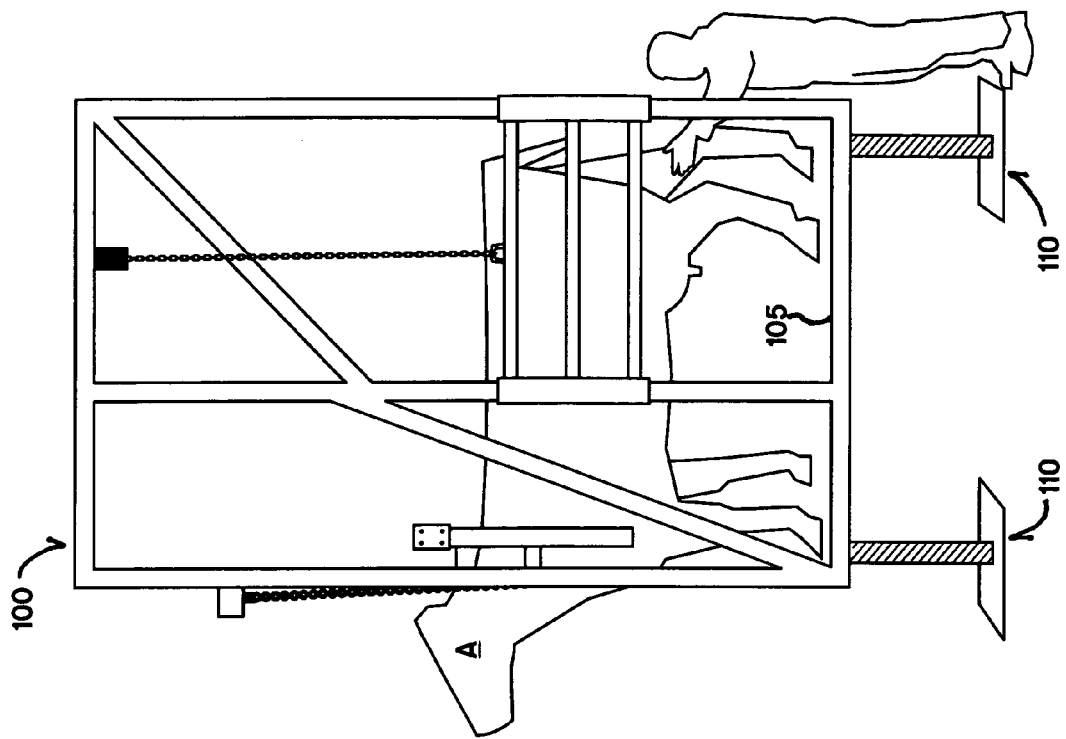
FIG. 3 is a right side elevational view of the embodiment of FIG. 1.
Figure 4:
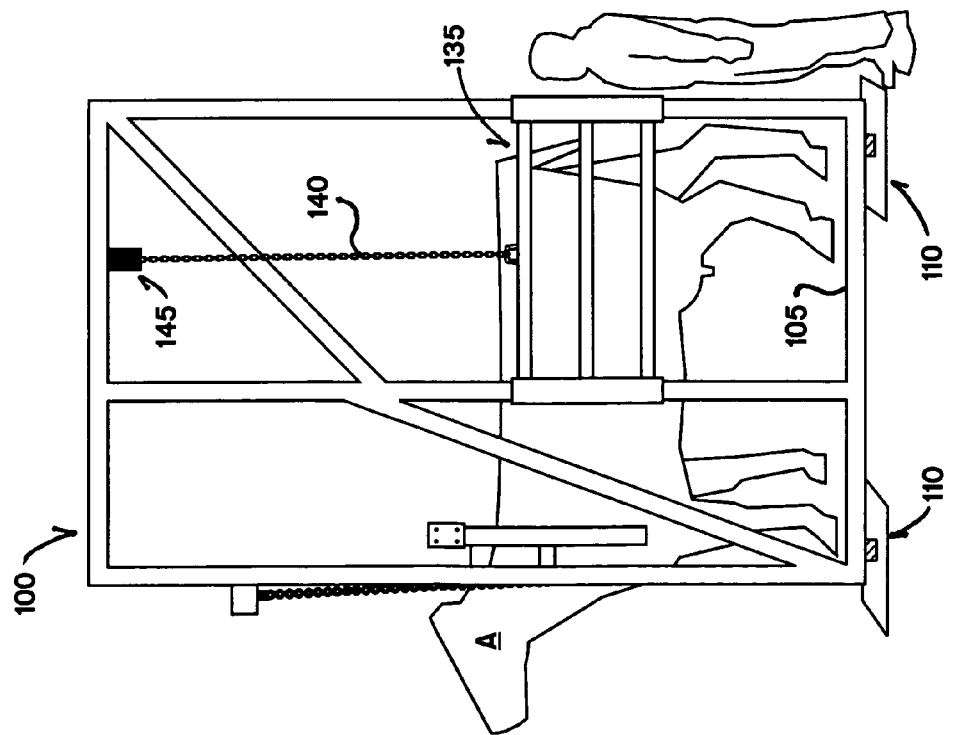
FIG. 4 is a right side elevational view of the embodiment of FIG. 2.

In operation, when platform 105 is in a lowered position, as shown in FIGS. 1 and 3, animal A may be led thereon without having to ascend a ramp or steps. Then, driver 125 extends legs 113 and elevates platform 105 into the raised position, as shown in FIGS. 2 and 4. On platform 105 in the raised position, animal A is at a height that allows a dairy hand to milk animal A without having to bend over to attach a milking apparatus (not shown). Once the milking procedure is complete, driver 125 returns platform 105 to the lowered position whereby animal A exits without having to descend a ramp or steps.

Figure 19:
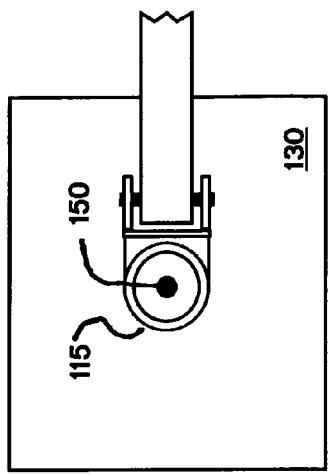
FIGS. 18 and 19 respectively are a vertical, cross-sectional detail view and a plan, partial cross-sectional detail view of an embodiment of an elevator configured according to principles of the invention.
Figure 18:
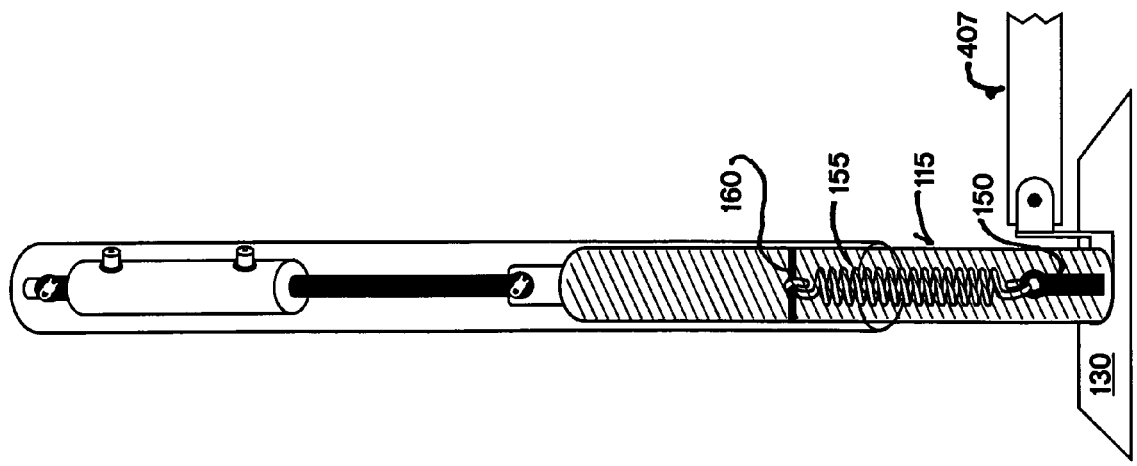

Referring to FIGS. 18 and 19, to avoid the considerable stress that otherwise would arise at the joint between strut 115 and foot 130 when apparatus 100 is situated on uneven ground, strut 115 and foot 130 are connected via a unique, stress-equalizing convention. Rather than directly welding strut 115 to foot 130, a short stub 150 extends from foot 130 into a recess in strut 115. A tension spring 155 draws together stub 150 and a dowel 160 that extends across the recess in strut 115. This allows foot 130 to pivot somewhat relative to strut 115 to accommodate virtually any grade without concentrating stress in weldment therebetween.

Referring to FIG. 3, apparatus 100 preferably includes a gate 135 for selectably receiving and retaining or excluding animals A. Gate 135 may be raised and lowered by a chain 140 that is manually or mechanically gathered and released through a pulley 145. The invention may employ other means for actuating gate 135, such as pneumatic, hydraulic or electromagnetic cylinders (not shown).

In operation, When gate 135 is in an up position, animals may enter onto platform 105. When gate 135 is in a down position (not shown), animals may not enter onto or leave platform 105.

Figure 7:
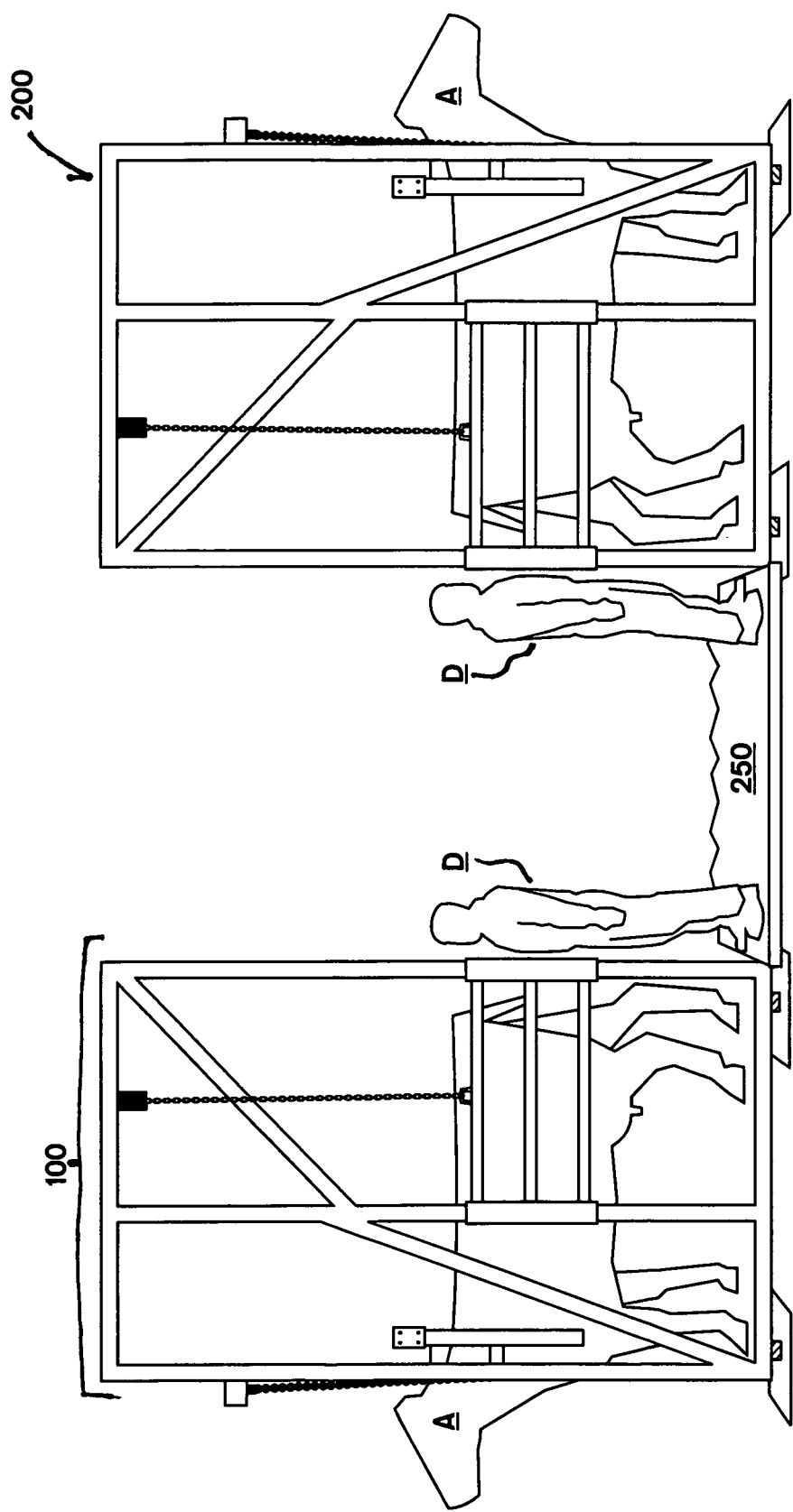
FIG. 7 is a side elevational view of another embodiment of a portable milking apparatus configured according to principles of the invention defining a lowered position.
Figure 8:
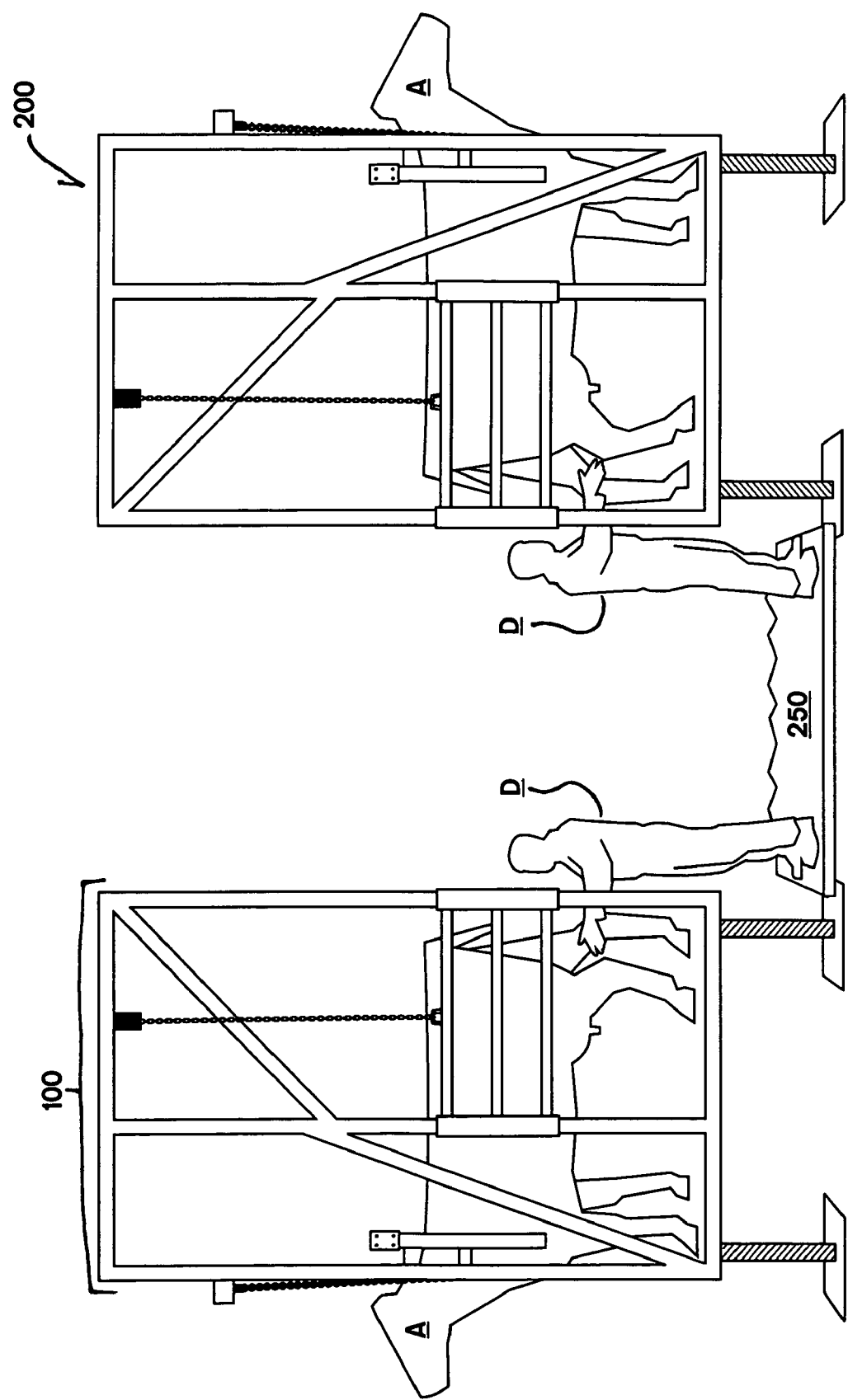
FIG. 8 is side view of the embodiment of FIG. 7 defining a raised position.

Referring to FIGS. 7 and 8, another embodiment of the portable milking apparatus 200 configured according to principles of the invention essentially multiple apparatuses 100 arranged as needed. Preferably, dairy hands D stand on a platform 250 positioned a few inches off of ground G while milking animal A. Although not shown above, platform 250 may be used with apparatus 100 as well.

Preferably, apparatuses 100 and 200 each include at least a wheel (not shown) rotatably mounted thereon, for example on foot 135, leg 110 or platform 105, or other means that promotes mobility of apparatus 100 so that apparatus 100 may be transported readily to wherever animals to be milked happen to be in the pasture. This mobility eliminates the issues associated with centralized milking facilities described above. Apparatuses 100 and 200 may be self-propelled or drawn to wherever it may be needed.

Referring to FIG. 9, an embodiment of a portable milking method 300 includes a step 305 of elevating the animal sufficiently to enable milking at an ergonomically optimal height. Step 305 excludes inclined traversing. In other words, as shown in FIGS. 1 and 3, animal A does not enter onto platform 105 by having to ascend a ramp or steps.

Figure 10:
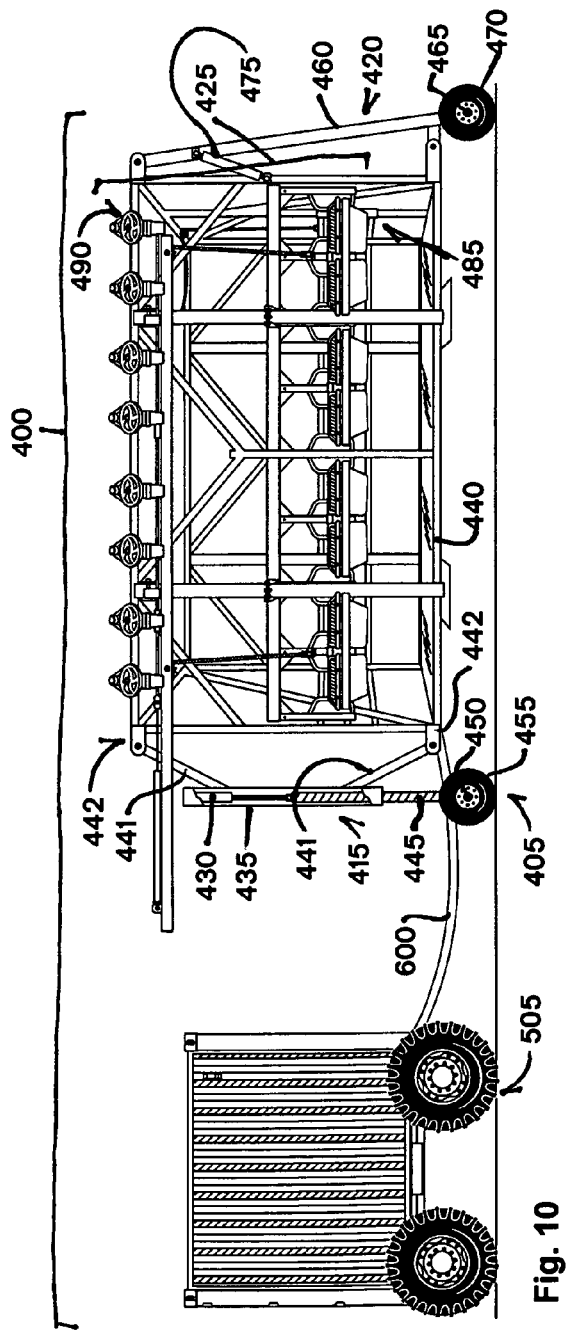
FIG. 10 is a side elevational view of a further embodiment of a portable milking apparatus configured according to principles of the invention defining a stowed position.
Figure 11:
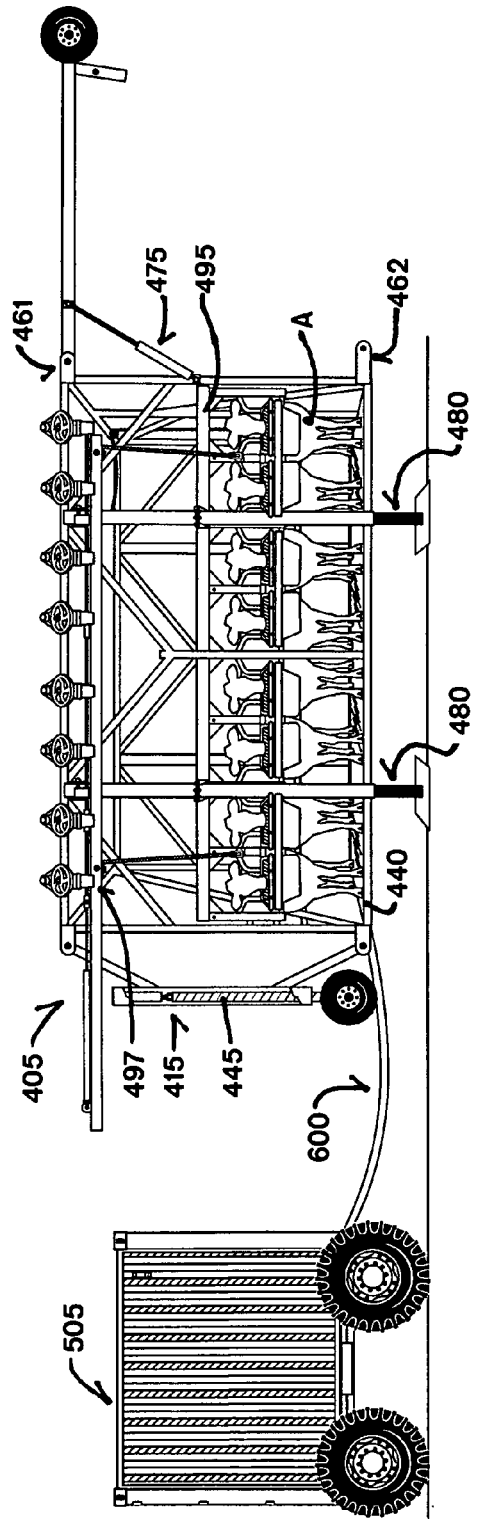
FIG. 11 is a side elevational view of the embodiment of FIG. 10 defining a raised position.
Figure 12:
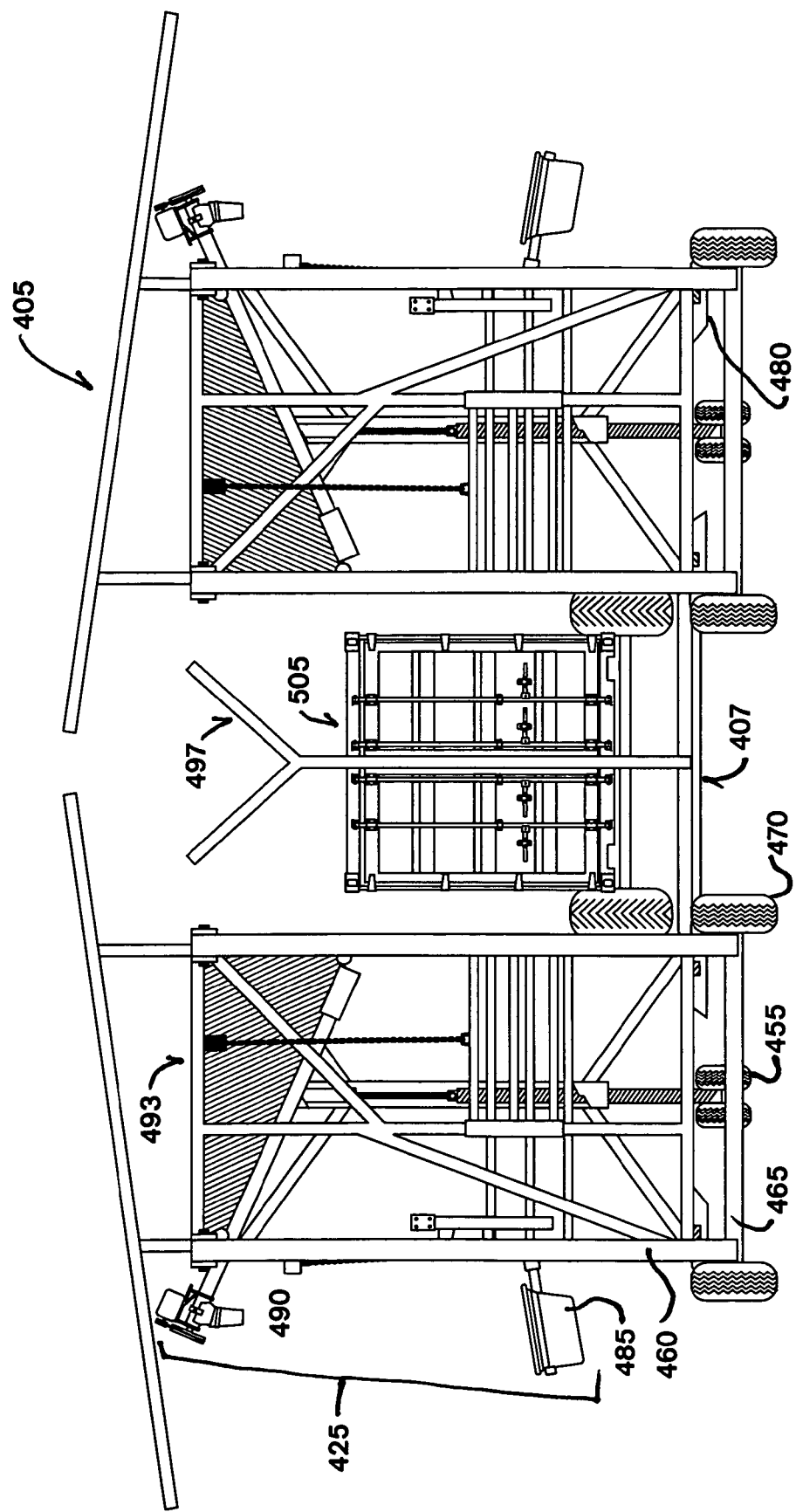
FIG. 12 is a rear elevational view of the embodiment of FIG. 10 defining a stowed position.

Referring to FIGS. 10-12, a further embodiment of a portable milking apparatus 400 configured according to principles of the invention is shown. Apparatus 400 includes a milking unit 405 and a service unit 505. FIG. 10 shows apparatus 400 wherein milking unit 405 is in a stowed position in which it may be moved across a field or highway. FIG. 11 shows apparatus 400 wherein milking unit 405 is in a raised position having received animals A for milking. FIG. 12 shows a rear elevational view of apparatus 400 in a "double 8" configuration wherein milking unit 405 is shown in a stowed position.

Milking unit 405 is similar to apparatus 100 described above. Milking unit 405 also includes retractable wheel assemblies 415 and 420 and a feeder 425.

Wheel assembly 415 includes a driver 430 that is received in a casing 435. Driver 430 is comparable to driver 125. Casing 435 is operably connected with braces 441 to ears 442 extending from platform 440. Driver 430 is operably connected to a support 445 that maintains an axle 450 for two wheels 455. Driver 430 may be expanded to urge support 445 out of casing 435 and lower wheels 455 relative to platform 440, which thereby would raise platform 440 off of the ground.

Referring also to FIG. 12, wheel assembly 420 includes a support 460 that maintains an axle 465 for two wheels 470. A pneumatic cylinder 475 may be extended to urge support 460 to pivot about ear 461 away from platform 440 and move wheels 470 out of the way. This allows elevators 480, which are comparable to elevators 110, to raise and lower platform 440 without interference by wheels 470.

Ears 442, 461 and 462 allow for substituting wheel assembly 415 for wheel assembly 420 and vice versa, or employing an entirely different wheel assembly operable with any suitable drive convention appropriate for the invention.

Preferably, the two halves of the double 8-style milking unit 405 are selectably connected via a platform 407 that is comparable to platform 250 with a tab and ear system comparable to that described with respect to wheel assemblies 415 and 420. This allows for disassembly of the parlor and for the parlor to be on uneven ground without bending platform 407.

Feeder 425 includes a trough 485 and an auger 490 for dispensing feed therein. Trough 485 is mounted on a frame 495 that may be raised and lowered with chain drive 493 or other suitable mechanism. In the lowered position, as shown, trough 485 is readily accessible by animals that are being milked. When a milking session is ended, trough 485 may be raised to allow animals to pass thereunder. In this raised position, trough 485 also is positioned near auger 490, which draws feed from a bin 493 and for assured, neat feed dispensing in trough 485.

Preferably, milking unit 405 is covered with a canvas-and-pipe roof 497.

Service unit 505 can provide locomotive means for moving milking unit 405. Exemplary locomotive means may include, but are not limited to pedal- or motor-powered chain- or belt-driven mechanisms.

Service unit 505 can provide for housing equipment for powering mechanisms associated with milking unit 405 and/or typically employed in milking operations. Exemplary equipment may include, but is not limited to an electrical generator, fluid compressor, refrigeration unit, vacuum pump, and hydraulic systems.

Service unit 505 can provide a container for storing and shipping milking unit 405 in a collapsed or disassembled state (not shown). In other words, milking unit may be disassembled and the parts thereof nested and stacked for ready storage in service unit 505.

Connector 600 connects milking unit 405 and service unit 505. In one embodiment, connector 600 is configured to serve as a tow bar or comparable mechanism so that service unit 505 can maneuver milking unit 405. In the same or different embodiment, connector 600 is configured to provide communication between cooperative or interrelated devices on each of service unit 505 and milking unit 405. For example, milking unit 405 may employ one or more milking devices that receive milk that is delivered to service unit 505 through connector 600 for storage in a refrigerator. Service unit 505 may house a compressor (not shown) and deliver compressed fluid through connector 600 or an electric generator (not shown) and deliver electrical power through connector 600 for powering equipment employed on milking unit 405, like a cylinder or jack. Removing noisy power-generating or powered equipment from milking unit 405 reduces stress and promotes healthier more productive animals.

Figure 13:
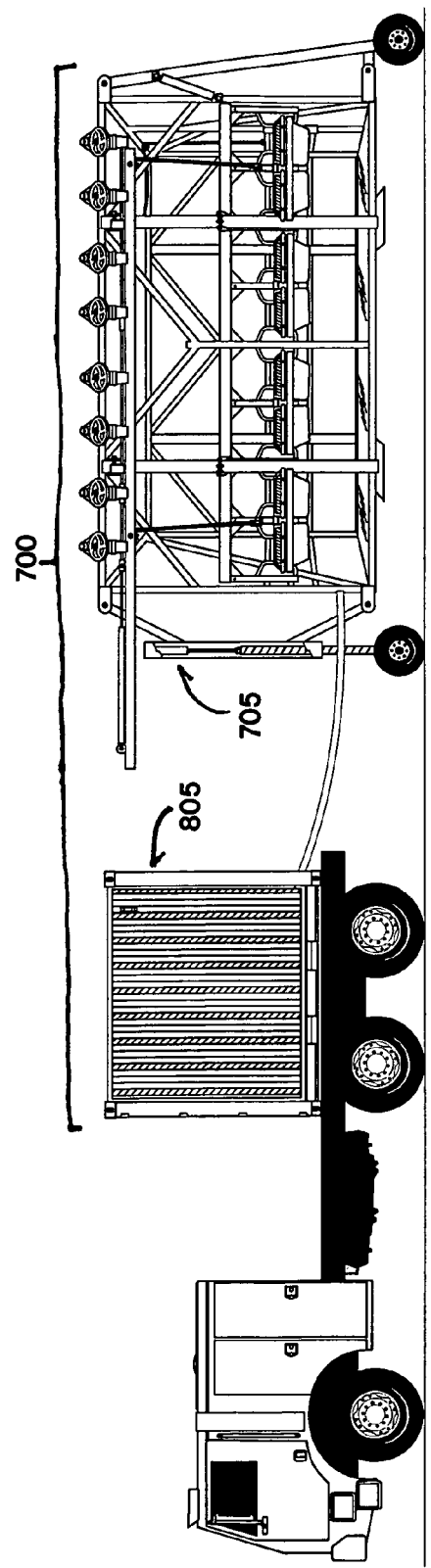
FIG. 13 is a side elevational view of yet another embodiment of a portable milking apparatus configured according to principles of the invention defining a stowed position.

Referring to FIG. 13, another embodiment of a portable milking apparatus 700 configured according to principles of the invention includes a milking unit 705 that is comparable to milking unit 405. Portable milking apparatus 700 includes a service unit 805 that is similar to service unit 505, except that service unit 805 lacks the self-propulsion capacity and concomitant mechanisms, such as wheels, thus presents a more compact and readily shipable configuration.

Automated milking and apparatuses for automated milking of animals are known. See, for example, U.S. Pat. No. 7,146,928, issued Dec. 12, 2006 to Ealy et al. for Live Capture Automated Milking Apparatus and Method. Automated milking typically includes or is characterized by at least locating and attaching a teatcup to the individual teats of a dairy animal without human guidance. Subsequent operations, such as drawing milk from the animal, and removing and sanitizing the teacups, also are typical of automated milking operations.

In practice, automated milking apparatuses are installed in permanent installations, such as the concrete floor of a milking barn, the disadvantages of which having been described above. The invention employs all of the benefits of automated milking methods and apparatuses, but is not limited to permanent installation, rather is fully enable for implementation in the present portable milking apparatus.

Referring to FIGS. 14 and 15, yet another embodiment of a portable milking apparatus 900 configured according to principles of the invention includes a milking unit 905 that is configured and equipped for automated milking. Service unit 1005 is comparable to service unit 505 or 805. Connector 1200 is comparable to connector 600.

Referring to FIG. 16, yet a further embodiment of a portable milking apparatus 1100 configured according to principles of the invention is configured similarly to apparatus 100 or milking units 405, 705 or 905, but also includes access panels 1105. Access panels 1105 are configured and located for ready examination of animals, in particular for ascertaining whether the animal is pregnant. Referring also to FIGS. 17a and 17b, access panels 1105 are positionable in a closed position, as shown in FIGS. 16 and 17a, and an access position, as shown in FIG. 17b. Conventional slides bolts 1110 or any other kind of latch may be used to secure access panel 1105 in the desired position.

The invention is not limited to the particular embodiments described and depicted herein, rather only to the following claims.

I claim:

1. Apparatus for milking an animal comprising:
    a milking unit that is mobile and configured for milking an animal;
    a service unit that is mobile and configured for receiving milk; and
    a connector that selectably:
        connects said milking unit and said service unit so that said service unit can maneuver or tow said milking unit; and
        provides for fluid communication between said milking unit and said service unit;
    wherein said milking unit comprises:
        a platform configured to maintain the animal; and
        an elevator that positions said platform in at least a lowered position, wherein said platform is generally aligned with the ground, and a raised position that enables milking from the ground at an ergonomically optimal height.

2. Apparatus of claim 1, wherein said milking unit is configured for receiving the animal.

3. Apparatus of claim 1, wherein said milking unit is configured for automated milking.

4. Apparatus of claim 1, wherein a distance between said lowered position and said raised position is adjustable.

5. Apparatus of claim 1, further comprising a second platform mounted relative to said elevator and said platform such that said elevator positions said platform relative to said second platform.

6. Apparatus of claim 1, further comprising a stall configured to retain the animal on said platform.

7. Apparatus of claim 1, further comprising an access panel selectably positionable in an access position, whereby a portion of the animal may be examined.

8. Apparatus of claim 1, further comprising a retractable gate configured to selectably retain the animal on said platform.

9. Apparatus of claim 8, further comprising a feed trough mounted relative to said gate.

10. Apparatus of claim 9, wherein, when said gate is positioned to retain an animal, the animal may access said feed trough.

11. Apparatus of claim 9, further comprising an auger mounted relative to said platform configured to dispense feed into said feed trough.

12. Apparatus of claim 11, wherein when said gate defines a retracted position, said feeder is positioned for receiving feed from said auger.

13. Apparatus of claim 1, further comprising a ground-engageable wheel rotatably mounted relative to said platform.

14. Apparatus of claim 13, wherein said wheel is positionable relative to said platform.

15. Apparatus of claim 1, wherein said elevator comprises a hydraulic or pneumatic cylinder, a rack and pinion, a jackscrew or combinations thereof.

16. Apparatus of claim 1, further comprising a foot pivotally mounted on said elevator.

17. Apparatus of claim 1, further comprising an access panel mounted relative to said platform that is positionable in at least an access position and a closed position.

18. Apparatus of claim 1, wherein said service unit is self-propelled.

19. Apparatus of claim 1, wherein said service unit is configured to maintain milk processing equipment.

20. Apparatus of claim 19, wherein said service unit is configured to maintain a power supply for the milk processing equipment.

21. Apparatus of claim 19, wherein said milking unit is configured to be able to be disassembled into milking unit parts and said service unit is configured to receive said milking unit parts.

* * * * *